US008379856B2

(12) United States Patent
Potkonjak

(10) Patent No.: US 8,379,856 B2
(45) Date of Patent: Feb. 19, 2013

(54) HARDWARE BASED CRYPTOGRAPHY

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 833 days.

(21) Appl. No.: 12/486,451

(22) Filed: Jun. 17, 2009

(65) Prior Publication Data

US 2010/0322418 A1    Dec. 23, 2010

(51) Int. Cl.
*H04K 1/00* (2006.01)

(52) U.S. Cl. ........ 380/255; 380/259; 380/260; 380/262; 380/278; 713/171; 713/185; 726/20

(58) Field of Classification Search .................. 380/255, 380/259–260, 262; 713/171, 185; 726/20
See application file for complete search history.

(56) References Cited

U.S. PATENT DOCUMENTS

| | | | |
|---|---|---|---|
| 3,668,319 A | 6/1972 | Gerke et al. | |
| 4,112,495 A | 9/1978 | Easley | |
| 4,523,827 A | 6/1985 | Masunaga et al. | |
| 4,525,849 A | 6/1985 | Wolf | |
| 5,131,038 A | 7/1992 | Puhl et al. | |
| 5,133,231 A | 7/1992 | Goto et al. | |
| 5,140,871 A | 8/1992 | Goto et al. | |
| 5,168,777 A | 12/1992 | Isono et al. | |
| 5,182,970 A | 2/1993 | Goto et al. | |
| 5,293,789 A | 3/1994 | Goto et al. | |
| 5,559,961 A | 9/1996 | Blonder | |
| 5,757,912 A | 5/1998 | Blow | |
| 5,770,846 A | 6/1998 | Mos et al. | |
| 5,999,629 A | 12/1999 | Heer et al. | |
| 6,018,717 A | 1/2000 | Lee et al. | |
| 6,076,163 A | 6/2000 | Hoffstein et al. | |
| 6,098,144 A | 8/2000 | De Oliveira | |
| 6,140,935 A | 10/2000 | Hayton et al. | |
| 6,289,324 B1 | 9/2001 | Kawan | |
| 6,446,206 B1 | 9/2002 | Feldbaum | |
| 6,687,714 B1 | 2/2004 | Kogen et al. | |
| 7,098,144 B2 | 8/2006 | Zhang et al. | |

(Continued)

FOREIGN PATENT DOCUMENTS

WO    2011016900 A2    2/2011

OTHER PUBLICATIONS

Devadas, "Physical Unclonable Functions for Device Authentication and Secrey Key Generation."*

(Continued)

*Primary Examiner* — Andrew Georgandellis
(74) *Attorney, Agent, or Firm* — Hope Baldauff Hartman, LLC

(57) ABSTRACT

Technologies are generally described for a hardware cryptographic unit that employs hardware public physically unclonable functions. A source computer can encrypt a message using a simulation of a hardware cryptographic unit. The encrypted message can then be sent to a destination computer. The destination computer can then use the hardware cryptographic unit to decrypt the message. The source computer can use a simulation of the hardware cryptographic unit to transform an input value into a simulation output. The simulation output can be transmitted from the source computer to the destination computer where all possible input values can be rapidly run through the hardware cryptographic unit until the output of the hardware cryptographic unit matches the simulated output. The input value that generated the matching output is now a shared secret between the source computer and destination computer without ever having been transmitted in the clear over the communication channel.

20 Claims, 8 Drawing Sheets

U.S. PATENT DOCUMENTS

| | | | |
|---|---|---|---|
| 7,156,301 | B1 | 1/2007 | Bonalle et al. |
| 7,172,112 | B2 | 2/2007 | Bonalle et al. |
| 7,185,175 | B2 | 2/2007 | Kravec et al. |
| 7,191,333 | B1 | 3/2007 | Maddury et al. |
| 7,206,847 | B1 | 4/2007 | Alberth et al. |
| 7,228,155 | B2 | 6/2007 | Saunders |
| 7,255,745 | B2 | 8/2007 | Zhang et al. |
| 7,306,158 | B2 | 12/2007 | Berardi et al. |
| 7,376,839 | B2 | 5/2008 | Carta et al. |
| 7,418,717 | B1 | 8/2008 | Dolske et al. |
| 7,574,611 | B2 | 8/2009 | Cohen |
| 7,609,092 | B2 | 10/2009 | Wicki et al. |
| 7,681,103 | B2 | 3/2010 | Devadas et al. |
| 7,757,083 | B2 | 7/2010 | Devadas et al. |
| 7,761,714 | B2 | 7/2010 | Luzzi et al. |
| 7,825,774 | B2 | 11/2010 | O'Toole et al. |
| 7,840,803 | B2 | 11/2010 | Clarke et al. |
| 7,904,731 | B2 | 3/2011 | Devadas et al. |
| 2003/0177374 | A1 | 9/2003 | Yung et al. |
| 2003/0204743 | A1 | 10/2003 | Devadas et al. |
| 2003/0212829 | A1 | 11/2003 | Schofield et al. |
| 2004/0054907 | A1 | 3/2004 | Chateau et al. |
| 2004/0056416 | A1 | 3/2004 | Bennett, III |
| 2004/0078421 | A1 | 4/2004 | Routt |
| 2004/0184615 | A1 | 9/2004 | Elliott et al. |
| 2005/0015411 | A1 | 1/2005 | Altman |
| 2005/0093868 | A1 | 5/2005 | Hinckley |
| 2005/0105366 | A1 | 5/2005 | Pedlow |
| 2005/0154858 | A1 | 7/2005 | Kravec et al. |
| 2005/0225079 | A1 | 10/2005 | Woontner |
| 2005/0268096 | A1 | 12/2005 | Kilian et al. |
| 2006/0010079 | A1 | 1/2006 | Brickell |
| 2006/0119913 | A1 | 6/2006 | Moon |
| 2006/0248340 | A1 | 11/2006 | Lee et al. |
| 2006/0271793 | A1 | 11/2006 | Devadas et al. |
| 2007/0174629 | A1 | 7/2007 | Suominen |
| 2007/0183194 | A1 | 8/2007 | Devadas et al. |
| 2009/0083833 | A1 | 3/2009 | Ziola et al. |
| 2009/0169018 | A1 | 7/2009 | Deisher |
| 2009/0222672 | A1 | 9/2009 | Clarke et al. |
| 2010/0085075 | A1 | 4/2010 | Luzzi et al. |
| 2010/0127822 | A1 | 5/2010 | Devadas |
| 2010/0293384 | A1 | 11/2010 | Potkonjak |
| 2010/0293612 | A1 | 11/2010 | Potkonjak |

OTHER PUBLICATIONS

Bellare, M., et al., "Relations Among Notions of Security for public-Key Encryption Schemes", Feb. 1999, Advances in Cryptology—Crypto '98 Proceedings, Lecture Notes in Computer Science, vol. 1462., 32 pages.

Boneh, D., et al., "Identity-Based Encryption from the Weil Pairing", 2003, SIAM Journal of Computing, 32(3):586-615.

Diffie, W., et al., "New Directions in Cryptography", Jun. 3, 1976, IEEE International Symposium on Information Theory, Ronneby, Sweden, 12 pages.

Flajolet, et al., "Birthday Paradox, Coupon Collectors, Caching Algorithms and Self-Organizing Search", 1987, INRIA: Unite de Recherche INRIA-Rocquencourt, No. 720, 20 pages.

Gassend, et al., "Controlled Physical Random Functions", Dec. 9-13, 2002, Proceedings of the 18$^{th}$ Annual Computer Security Applications Conference, 12 pages.

Majzoobi, et al., "Lightweight Secure PUFs", 2008, IEEE/ACM International Conference on Computer Aided Design (ICCAD), 4 pages.

Majzoobi, et al., "Testing Techniques for Hardware Security", 2008, IEEE International Test Conference, 10 pages.

Okamoto, T., et al., "A New Public-Key Cryptosystem as Secure as Factoring", 1998, Eurocrypt '98, LNCS 1403, Abstract.

Paillier, P., "Public-Key Cryptosystems Based on Composite Degree Residuosity Classes", 1999, Advances in Cryptology—Eurocrypt '99, vol. 1592 of Lecture Notes in Computer Science, pp. 223-238.

Rivest, R., et al., "A Method for Obtaining Digital Signatures and Public-Key Cryptosystems", Feb. 1978, Communications of the ACM, 21(2):120-130.

Saxena, et al., "Variation in Transistor Performance and Leakage in Nanometer-Scale Technologies", Jan. 2008, IEEE Transactions on Electron Devices, 55(1):131-144.

Suh, G., et al., "Physical Unclonable Functions for Device Authentication and Secret Key Generation", Jun. 4-8, 2007, DAC 2007, San Diego, California, 6 pages.

Wagner, D., "A Generalized Birthday Problem", 2002, Crypto, pp. 288-303.

Lamport, L., "Constructing Digital Signatures from a One-Way Function," Oct. 18, 1979, pp. 8.

Mambo, M., et al., "Proxy Signatures for Delegating Signing Operation," Proceedings of the 3rd ACM Conference on Computer and Communications Security, Mar. 14-15, 1996, pp. 48-57.

Pappu, R., et al., "Physical one-way functions," Science, vol. 297, No. 5589, Sep. 20, 2002, pp. 2026-2030.

Rabin, M. O., "Digitalized Signatures and Public-Key Functions as Intractable as Factorization,", Jan. 1979, pp. 20.

Boneh et al., "Short Signatures from the Weil Pairing," Dec. 9-13, 2001, Proceedings of the 7th International Conference on the Theory and Application of Cryptology and Information Security: Advances in Cryptology, p. 514-532.

Boyar et al,, "Convertible Undeniable Signatures," Aug. 11-15, 1990, Proceedings of the 10th Annual International Cryptology Conference on Advances in Cryptology, p. 189-205.

Chaum et al., "Undeniable signatures," Jul. 1989, Proceedings on Advances in cryptology, Santa Barbara, California, p. 212-216.

Horster et al, "Meta-ElGarnal signature schemes," Nov. 1994, Proc. of the 2nd ACM Conference on Computer and communications security, p. 96-107. Abstract.

Ngai et al., "A review for mobile commerce research and applications," Feb. 2007, Decision Support Systems, 43 (1,): 3-15.

Tuyls et al., "Read-proof hardware from protective coatinas", Oct. 10-13, 2006, Cryptographic Hardware and Embedded Systems—CHES 2006, ser. Lecture Notes in Computer Science, vol. 4249, pp. 369-383.

Alkabani et al., "Trusted Integrated Circuits: A Nondestructive Hidden Characteristics Extraction Approach." 2008, Information Hiding, Lecture Notes in Computer Science, 5284/2008: 102-117. Abstract.

ElGamal, "A Public.Key Cryptosystem and a Signature Scheme Based on Discrete Logarithms," Jul. 1985, IEEE Trans. on Information Theory, IT-31(4): 469-472.

Fiat, et al., "How to prove yourself: practical solutions to identification and signature problems," Jan. 1987, Proceedings on Advances in cryptology—CRYPTO '86, p. 188-194.

Goldwasser et al, "A digital signature scheme secure against adaptive chosen-message attacks," SIAM Journal on Computing, 17(2):281-308, Apr. 1988.

Hernandez-Velez, M. "Nanowires and 1D arrays fabrication: An Overview"; Thin Solid Films 495(1-2): 51-63, Jan. 2006. Abstract.

Holcomb et al., "Initial SRAM State as a Fingerprint and Source of True Random Numbers for RFID Tags", Jul. 2007, Proceedings of the Conference on RFID Security, 12 pages.

Lee et al., "A technique to build a secret key in integrated circuits for identification and authentication application", Jun. 17-19, 2004, Symposium on VLSI Circuits, Digest of Technical Papers, pp. 176-179.

Lim et al., "Extracting secret keys from integrated circuits", 2005, IEEE Transactions on Very Large Scale Integration (VLSI) Systems, 13(10): 1200-1205.

Lysyanskya, Anna, "Signature Schemes and Applications to Cryptographic Protocol Design", PhD thesis, MIT, Sep. 2002, 134 pages.

Merkle, Ralph "A certified digital signature", 1989, Proceedings on Advances in Cryptology—CRYPTO '89, vol. 435, pp, 218-238.

Messerges et al., "Digital rights management in a 3G mobile phone and beyond," Oct. 2003 Proceedings of the 3rd ACM workshop on Digital rights management, pp. 27-38.

Paterson, K. "ID-based signatures from pairings on elliptic curves," Aug. 29, 2002, Electronics Letters, 38 (18):1025-1026.

Ravikanth, P., "Physical one-way functions", Mar. 2001, Thesis, MIT, 154 pages.

Shamsi et al., "Noninvasive Leakage Power Tomography of Integrated Circuits." 2008, Proceedings of the 13th International Symposium on Low Power Electronics and Design (ISPLED '08), ACM, pp. 341-346.

Shamir, Adi "Identity-based cryptosystems and signature schemes," Aug. 1985, Proceedings of CRYPTO 84 on Advances in cryptology, p. 47-53.

Xia et al, "One-Dimensional Nanostructures: Sythesis, Characterization, and Applications," Mar. 4, 2003, Advanced Materials, 15(5): 353-389.

Alkabani et al., "Input Vector Control for Post-Silicon Leakage Current Minimization in the Presence of Manufacturing Variability." 2008, Proc. Of the 45th Annual design automation conference (DAC '08), pp. 606-609. Abstract.

Beckmann et al., "Hardware-Based Public-Key Cryptography with Public Physically Unclonable Functions," 2009, 11th International Workshop 2009 on Information Hiding, Darmstadt, Germany, Jun. 8-10, 2009, Lecture Notes in Computer Science, vol. 5806/2009, pp. 206-220.

International Search Report dated Feb. 1, 2011 in International Application No. PCT/US2010/037918.

U.S. Office Action dated Oct. 14, 2011 in U.S. Appl. No. 12/464,387.

U.S. Office Action dated Jun. 5, 2012 in U.S. Appl. No. 12/464,387.

U.S. Office Action dated Feb. 1, 2012 in U.S. Appl. No. 12/464,384.

Burrows, M., et al., "A Logic of Authentication", Feb. 1990, ACM Transactions on Computer Systems, 8(1):18-36.

Chaum, D., "Blind Signatures for Untraceable Payments", 1983, Advances in Cryptology: Proceedings of Crypto 82, Plenum Press, pp. 199-203.

Chaum, D., "Untraceable Electronic Mail, Return Addresses, and Digital Pseudonyms", Feb. 1981, Communications of the ACM, 24(2): 84-90.

Feige, et al., "Zero Knowledge Proofs of Identity", Jun. 1988, Journal of Cryptology, 1(2):77-94.

Gassend, et al. "Silicon physical random functions", 2002, Proceedings of the 9th ACM conference on Computer and Ocmmunications Security, pp. 148-160.

Halevi, S., et al., "Public-Key Cryptography and Password Protocols", 1998, ACM Transactions on Information and System Security, pp. 230-268, Abstract.

Haller, N., "The S/KeyTM One-Time Password System", 1994, Proceedings of the Internet Society Symposium on Network and Distributed Systems, pp. 151-157.

Kocher, P., "Timing Attacks on Implementations of Diffie-Hellman, RSA, DSS, and Other Systems", 1996, CRYPTO '96, LNCS 1109, Springer-Verlag, Berlin, 10 pages.

Lamport, L., "Password Authentication with Insecure Communication", Nov. 1981, Communications of the ACM, 24(11):770-772.

Lampson, B., et al., "Authentication in Distributed Systems: Theory and Practice", Nov. 1992, ACM Transactions on Computer Systems, 104):265-310.

Morris, R., et al., "Password Security: A Case History", 1979, Communications of the ACM, vol. 22, pp. 594-597.

Needham, R., et al., "Using Encryption for Authentication in Large Networks of Computers", Dec. 1978, Communications of the ACM, 21(12):993-999.

Neuman, B., et al., "Kerberos: An Authentication Service for Computer Networks" Sep. 1994, ISI Research Report, ISI/RS-94-399, IEEE Communications Magazine, 32(9):33-38.

Chang, C. and Wu, T., "Remote Password Authentication with Smart Cards," IEEE Proceedings, vol. 138, Issue 3, May 1991, pp. 165-168.

U.S. Office Action dated Oct. 2, 2012 in U.S. Appl. No. 12/464,384.

* cited by examiner

HARDWARE BASED CRYPTOGRAPHY

BACKGROUND

Cryptography can support the secure communication of information over potentially insecure communication channels. Messages to be transmitted over a communication channel can be encrypted with a key prior to transmission over the channel, and then decrypted at the receiver. Because the transmitted message is encrypted, there is reduced fear that the message will be read if it is intercepted from the communications channel before reaching the receiver. Symmetric key cryptographic systems are one example of cryptographic communications. In a symmetric key system, also known as a shared secret key system, both the transmitter and the receiver have the same secret key and that key is used to both encrypt and decrypt. Cryptographic techniques may also be used to secure stored data and in various other information and communication security applications.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
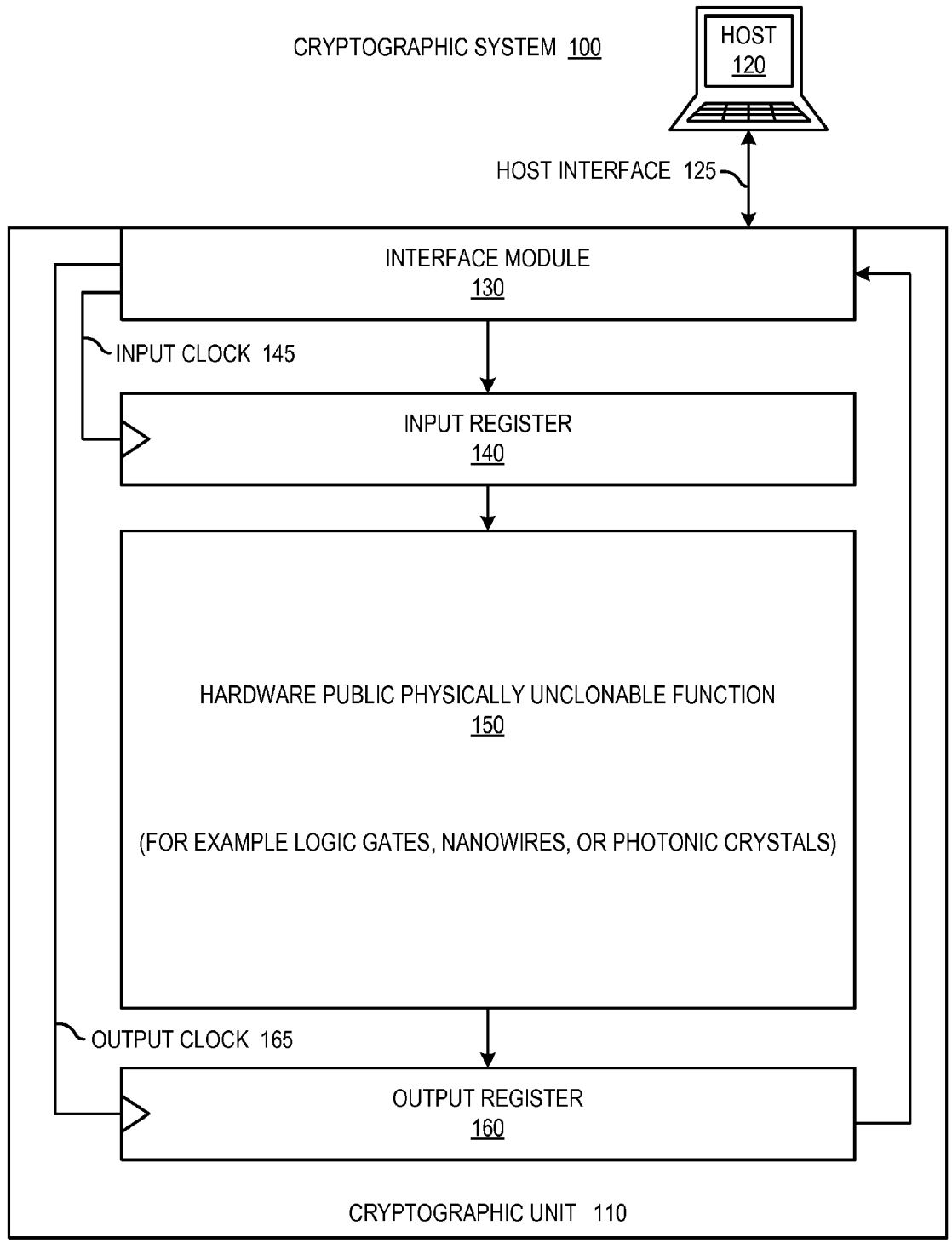
FIG. 1 is a block diagram illustrating a cryptographic system with a host computer and a hardware cryptographic unit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein.

This disclosure is drawn to methods, apparatus, systems and computer program products related to cryptographic hardware public physically unclonable functions. While traditional cryptographic techniques generally employ mathematical and computational approaches, physical laws and technology constraints may also be employed. For example, inherent manufacturing variability in semiconductor integrated circuits (ICs), particularly at very deep submicron technology scales, may be leveraged to produce unique, unclonable systems. The unclonable nature of such a device or system can provide the basis of secure cryptographic functionality.

Inherent manufacturing variability in modern and future complimentary metal-oxide semiconductor (CMOS) technologies, or other semiconductor technologies, can introduce gate-level uniqueness within each instance of manufacture. Various technological challenges arise when attempting to fabricate ICs with exact feature sizes for gates and interconnecting conductors. Similar challenges may affect doping levels. These challenges may include wafer lattice structure imperfections, non-uniform dopant distribution, mask misalignment, and chemical or mechanical polishing. As such, each manufactured IC of a single design may generally have gates that differ slightly in terms of their timing, area, power, and soft-error rate susceptibility. Operating such ICs in a manner as to manifest these subtle differences can provide ICs with unique operational characteristics. Similarly, photonic crystal based optical inter-chip and intra-chip interconnects may be leveraged as for their unique operational characteristics due to manufacturing variability. Such photonic interconnects can support high throughput and low delay distribution for signals and clocks.

A hardware cryptographic unit can be implemented as a large number of logic gates with an input register supplying inputs into the gates and an output register to latch the results from the gates at a specified time period later. A host computer can specify an input vector and a clocking period to generate a uniquely transformed output. Operation of the hardware cryptographic unit can begin by issuing the input vector to an input register of the hardware cryptographic unit. After the signals associated with the input vectors propagate through the logic gates of the hardware cryptographic unit, the results can be latched into the output register. The hardware cryptographic unit can generate the results in real-time, for example one or a few clock cycles. Since the results depend on timing characteristics of each gate, an attacker would have to simulate or emulate the hardware cryptographic unit at the gate-level with exact timing accuracy.

A source computer can encrypt a message using a simulation of a hardware cryptographic unit. The encrypted message can then be sent to a destination computer. The destination computer can then use the hardware cryptographic unit to decrypt the message. The destination computer can also be referred to as the host computer for the hardware cryptographic unit, since it is interfaced to the hardware cryptographic unit. The source computer can use a simulation of the hardware cryptographic unit to transform an input vector of input values into a simulation output. The simulation output can be transmitted from the source computer to the destination computer where all possible input values can be run through the hardware cryptographic unit until the output of the hardware cryptographic unit matches the simulated output. The input value that generated the matching output is now a shared secret between the source computer and destination computer without ever having been transmitted in the clear over the communication channel. The hardware cryptographic unit and the cryptographic techniques presented herein may be leveraged to support symmetric, asymmetric, secret, and public key approaches.

If the number of gates in the hardware cryptographic unit is given by N, simulation has a complexity of $O(N^3)$ for each input vector cycle and multiple cycles may be employed. Thus, for 100,000 gates, an attacker would require more than $10^{15}$ operations to be completed for simulating the hardware cryptographic unit and generating each pass over an input from a very large input value pool. In contrast, the hardware cryptographic unit can provide cryptographic passes as fast as one nanosecond and having an energy consumption of a few nanojoules.

The hardware cryptographic unit can map a specified input into unique outputs in one or few clock cycles. While it is possible to simulate the hardware cryptographic unit for a single input value for secret exchange, it is prohibitively slow to simulate outputs for enough of the possible input values to attack the secret key exchange. Thus, protocols that require that potential attackers to conduct complete simulations under real-time constraints can provide cryptographic functionality with a high level of security. For a typical example, a hypothetical attacker with a billion computers may require more than 30,000 years to break the encryption. It is this complexity gap between results provided by the hardware cryptographic unit and complete simulation of the hardware cryptographic unit that can support powerful and flexible hardware based cryptography.

Turning now to FIG. 1, a cryptographic system 100 with a host computer 120 and a hardware cryptographic unit 110 is illustrated according to one or more embodiments presented herein. The host computer 120 may access the hardware cryptographic unit 110 over a host interface 125. The hardware cryptographic unit 110 can be manufactured such that each individual instance of the manufacturing process produces a hardware cryptographic unit 110 that is unique from other hardware cryptographic units 110. As such, the physical possession of a hardware cryptographic unit 110 can support the possessor to uniquely process associated cryptographic functions very securely. The hardware cryptographic unit 110 can also be implemented as software, such as a software simulation of the hardware cryptographic unit 110.

The host interface 125 may be any computer interface. For example, the host interface 125 may be serial, parallel, universal serial bus (USB), peripheral component interconnect (PCI), wired, wireless, Bluetooth, radio frequency identification (RFID), fiber optical, free space optical, or any other interface reasonable for coupling the hardware cryptographic unit 110 to the host computer 120. An interface module 130 within the hardware cryptographic unit 110 can provide an interface between the hardware cryptographic unit 110 and the host interface 125 for communicating information to and from the host computer 120.

The host computer 120 may issue a cryptographic request to the hardware cryptographic unit 110. The cryptographic request may be offered to the hardware cryptographic unit 110 by communicating the request to the interface module 130 of the hardware cryptographic unit 110. An input vector of the cryptographic request may be provided as the initial values to be clocked into the input register 140 from the interface module 130. An input clock 145 may be used to clock the inputs into the input register 140. The input vector, once clocked into the input register 140, can feed into the hardware public physically unclonable function (HPPUF) 150.

The HPPUF 150 can be manufactured as a plurality of logic gates, semiconductor signal paths, an array of plasmonic paths, a photonic crystal structure, nanowire gates, any other nanowire structure, or any structure that may be varied slightly in each manufacturing instance in a fashion that affects the operation of the structure as measured. The variation in the structure between manufacturing instances may be does to manufacturing process variances, intentional manufacturing perturbations, or both. In a combinational logic HPPUF 150 embodiment, manufacturing variability can manifest as each logic gate having different delay, power, or other physical characteristics even between integrated circuits that correspond to the same design. The HPPUF 150 is a physical system that may be completely characterized so that it can be accurately simulated. However, the HPPUF 150 simulation can require a much longer time than the execution of the actual HPPUF 150 hardware.

Resulting output values from the HPPUF 150 can arrive at the output register 160. An output clock 165 can latch the output values of the HPPUF 150 into the output register 160 at a specified time. The output clock 165 can be generated at a specific time delay or phase offset from the input clock 145. A timing mechanism such as a timer, delay, phase locked loop, or otherwise may support the generation of a transition in the output clock 165 at the specified time after the transition in the input clock 145 that began the signal propagation through the HPPUF 150. The output values latched into the output register 160 can be delivered to the interface module 130 for access over the host interface 125 to the host computer 120. A cryptographic request can include specifying input values for the hardware cryptographic unit 110 to load into the input registers 140 along with a specified time for clocking the output values into the output register 160 using output clock 165.

The time required for complete simulation of all possible outputs of the HPPUF 150 can require a very long time. For example, the simulation may require time on the order of years, decades, or even centuries using today's most advanced technology. In contrast, the calculation of outputs using the HPPUF 150 hardware itself may require less than a nanosecond. Also, probabilistic verification of a small randomly selected subset of outputs can be done on the order of milliseconds.

The hardware cryptographic unit 110 may be considered intrinsically resilient against side channel attacks, physical attacks, and software vulnerabilities. The hardware cryptographic unit 110 may be inexpensive to manufacture and may be ultra fast and ultra low power. The hardware cryptographic unit 110 can be used in numerous applications such as communication links, radio communications, internet communications, web transactions, financial transactions, email, software download, password encryption, data storage, credit cards, identification cards, passports, subscriber identity modules (SIMs), smart financial notes, or various other secure applications. Unlike typical cryptographic techniques, the hardware cryptographic unit 110 may not depend upon unproven mathematical challenges. The hardware cryptographic unit 110 may be considerably less expensive, faster, and more power conserving than traditional approaches.

One hardware cryptographic unit 110 can employ one or more HPPUFs 150. For multiple HPPUFs 150, the input vectors may be identical or different. The input vectors may be derived from seeded random number generators. Multiple outputs or portions of outputs from one or more HPPUFs 150 may be used to support cryptographic functions of diverse simulation computational difficulty. For example, the HPPUFs may have different sizes and simulation requirements. The output from the HPPUF 150 may be applied to a hash function.

Time, radiation, electro-migration, and other effects may cause an HPPUF 150 to drift from its initial characterization. If this occurs, the hardware cryptographic unit 110 may generate results that no longer correspond to simulations based on the public characterization of the cryptographic unit 110. Instead of being discarded, the cryptographic unit 110 may be re-characterized and returned to use with an updated set of public descriptor information corresponding to its new physical properties.

Input data associated with a cryptographic function can be supplied to the hardware cryptographic unit 110 using a high bandwidth interconnect such as plasmonic, photonic crystal, radio frequency, or three-dimensional structures. The input vectors for a cryptographic function may be expanded by seeding or initializing ciphers, shift registers, linear feedback shift registers, random number generators to produce an increased number of input bits, or in any other manner.

The hardware cryptographic unit 110 may be used for various secure transactions, encryption of wireless or wired messages or packet, email encryption, or for any other purposes. For example, a customer or an associated service provider may be equipped with a hardware cryptographic unit 110 for supporting mutually secure communications.

Input values may be selected from a large selection space referred to as an input value pool. The input values may be used as a secret key. The HPPUF 150 based hardware cryptographic unit 110 can support the exchange of secret keys as described herein. The inputs of the HPPUF 150 may be first passed through a hash operation. The outputs of the HPPUF 150 may also be passed through a hash function. Hashing the outputs of the HPPUF 150 may force an attacker to calculate all outputs of the HPPUF 150 as opposed to attacking selected portions of the output. A hash function may also be provided between two HPPUFs 150 in situations where multiple HPPUFs 150 are applied serially.

The hardware cryptographic unit 110 can support hardware-based public or secret key protocols where both sides of the communication have special hardware and use it either simultaneously or sequentially. The hardware cryptographic unit 110 can support hardware-based public or secret key protocols where the final communicated message is obtained by combining multiple messages sent in parallel or sequentially using exclusive-OR (XOR) operations. The hardware cryptographic unit 110 can support hardware-based public or secret key protocols where the final communicated message is obtained by applying a function of the decrypted message and another communicated message that was communicated publically.

The hardware cryptographic unit 110 can support hardware-based public or secret key protocols where the final communicated message is obtained by XORing the decrypted message and another communicated message that was communicated publically. The hardware cryptographic unit 110 can support hardware-based public or secret key protocols where the address, or index, of the output position where a specific pattern is located is used to encode the communicated message.

The hardware cryptographic unit 110 may be multimodal where HPPUF 150 outputs may provide analog and/or digital signals. The signals may be established by gate delays, difference in gate delays, switching power, leakage power, and other physical or operations characteristics that can be measured from the authentication unit 110. The HPPUF 150 may employ multiplexers for eliminating logic or signal races between reconvergent paths within the HPPUF 150.

The HPPUF 150 may be configured with parameters such as supply voltage, bias voltages, or other operational settings such that the configuration settings impact the output of the HPPUF 150. Such configuration settings may be exchanged as part of the parameterized characteristics of the HPPUF 150, part of a cryptographic key exchange, or part of a separate set up or negotiation phase.

The HPPUF 150 along with supporting structures or modules, such as those associated with running elements of the input value pool through the HPPUF 150 to identify the desired output, may be located together on the hardware cryptographic unit 150. Such structures or modules may also be located outside of, and coupled to, the hardware cryptographic unit 110. The architecture of the hardware cryptographic unit 110 may be configured to support pipelined execution of support functions such as the output value search using the HPPUF 150.

A nanowire structure may be the basis of the HPPUF 150. Nanowire structures may include very tiny wire structures having cross-sections on the order of about 100 nanometers or less. Nanowire structures may be self assembling. A photonic crystal structure may also be the basis of the HPPUF 150. Such a photonic crystal may be considered a photonic nanostructure capable of interacting optically with electromagnetic waves.

Figure 2:
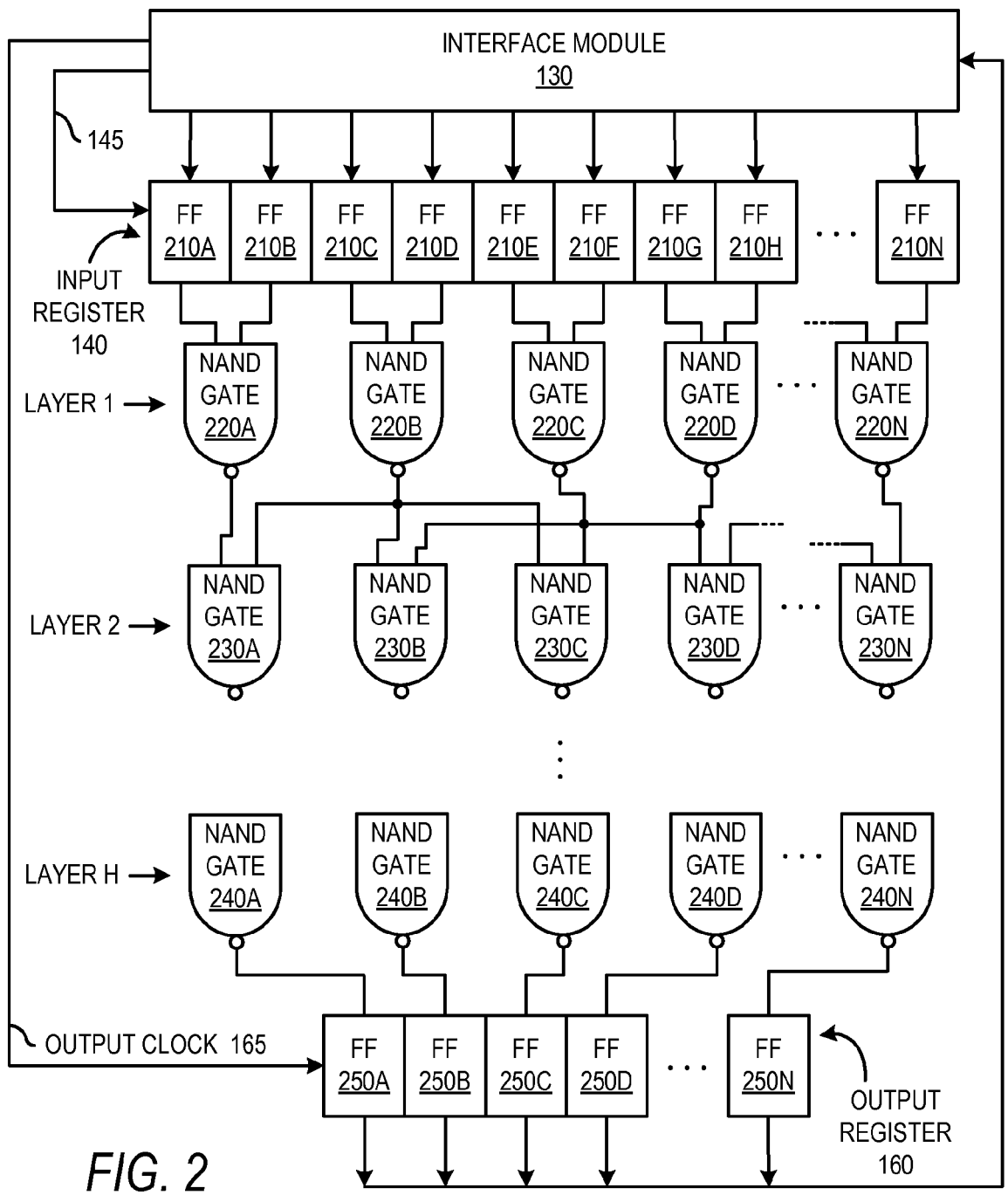
FIG. 2 is a block diagram illustrating a hardware cryptographic unit using a logic gate-based hardware public physically unclonable function.

Turning now to FIG. 2, a hardware cryptographic unit 110 using a logic gate hardware public physically unclonable function 150 is illustrated according to some embodiments presented herein. The input register 140 can be implemented as a collection of flip-flops 210A-210N. The flip-flops can be clocked by input clock 145 from the interface module 130. The outputs of the flip flops 210A-210N making up the input register 140 may serve as inputs to a first layer of NOT-AND (NAND) gates 220A-220N. The outputs from the first layer of NAND gates 220A-220N may serve as inputs to a second layer of NAND gates 230A-230N. The outputs from the second layer of NAND gates 230A-230N may serve as inputs to further layers of NAND gates continuing to layer H of NAND gates 240A-240N.

The outputs from layer H of NAND gates 240A-240N may serve as inputs into the output register 160. The output register 160 may be made up of an array of flip-flops 250A-250N. The output flip-flops 250A-250N can be clocked by an output clock 165. The outputs of the output of the output register 160 may feed back to the interface module 130 for response to the host computer 120. The total number of logic gates making up the HPPUF 150 may be tens, hundreds, thousands, millions, or more according to embodiments and operational context.

The HPPUF 150 may be formed from NAND gates as illustrated, however other types of logic gates may also be used. It should be appreciated that multiple input logic gates, such as 2 input, 3 input, 4 input, or otherwise may be used as the logic gates making up the HPPUF 150. Mixed types of logic gates and gates with varying numbers of inputs may be used within a single HPPUF 150. For example, OR gates, NOT-OR (NOR) gates, AND gates, NAND gates, exclusive-OR (XOR) gates, or other types of combinational logic may be used within the HPPUF 150. The interconnection between layers of logic gates, for example between the first layer of NAND gates 220A-220N and the second layer of NAND gates 230A-230N may be any variety of interconnections from one layer to the next, such that the outputs of each layer are reasonably dependent on a variety of inputs from the previous layer. The number of output flip-flops 250A-250N may generally be the same as the number of input flip-flops 210A-210N, although these two numbers may also vary.

The width of the HPPUF 150, or W, may be related to either one of, or both of, the number of input flip-flops 210A-210N and the number of output flip-flops 250A-250N. The number of layers within the HPPUF 150, or H, may be considered the height of the HPPUF 150. It may be advantageous for the product ($W \times 2^H$) to be large. Assuming that W=106 and H=80, approximately $10^{30}$ calculations may be needed to reproduce the output of the HPPUF 150. This may be compared to over one billion years on one billion computers. Reducing H to 60 may reduce the compared computation to about one million years on one million computers. Reducing H to about 50 can provide a computational complexity for the HPPUF 150 that will generally support secure operation of the cryptographic unit 110. Assuming that $W=10^9$, then H=40 will also generally support secure operation of the cryptographic unit 110. In general, values for H can be in the range of 2-100, or more.

When application of the HPPUF 150 is iterated M times, W may be reduced linearly with M while H may be reduced logarithmically with M. Thus, for $M=10^9$, values of $W=10^6$ and H=20 can generally support secure operation of the cryptographic unit 110. In general, W may be reduced to 1000 or even a few hundred, but it may be desirable to not reduce W below 100 in an attempt to avoid susceptibility to guess-based attacks. Setting W as large as possible may serve to reduce the required timing accuracy for sampling the output of the HPPUF 150.

Manufacturing variability within the semiconductor process for forming the hardware cryptographic unit 110 (and specifically, the logic gates of the HPPUF 150) can allow for uniqueness of each individually manufactured hardware cryptographic unit 110. For example, structure sizes and electrical characteristics of semiconductor structures or transistors within each gate may slightly alter the speed, delay, or timing related to each gate relative to other gates.

For example in one manufactured instance of the hardware cryptographic unit 110, NAND gate 220A may have more delay than NAND gate 220B. In another manufactured instance, NAND gate 220B may have more delay than NAND gate 220A. These variances may be related to manufacturing variability such as lithographic alignment, doping, metallization, or other semiconductor manufacturing characteristics. Variation in the delay of a signal through the logic gates within the HPPUF 150 can cause the output at each layer to contain multiple transitions as one gate generates its output later than another respective logic gate. For example, if NAND gate 220A has more delay than NAND gate 220B, the output from layer one into layer two will see a transition as NAND gate 220B delivers its output and then an additional transition at a slighter later time as NAND gate 220A generates its output.

At each of the H layers within the HPPUF 150, the number of transitions in the signals can be multiplied to the point where at the final layer, or layer H, the outputs vary for several sets of values over a time period beginning at the fastest signal to arrive at the output until quiescence at the final logic output. This period of output variability provides a window during which the output clock 165 may specifically sample a set of outputs. Because the timing variability between the various logic gates may be unique to each manufactured instance of the authentication unit 110, the specific logic states sampled at the output register 160 at a specific time may also be unique to the hardware cryptographic unit 110. Sampling this time instance as the result of the HPPUF 150 can provide the unique operation and output for cryptographic functions using the hardware cryptographic unit 110. Because exact sampling may be difficult, a response may be accepted as correct if it matches the output state of the HPPUF 150 over a small time window of variation around the specified sampling time.

When a specific instance of the hardware cryptographic unit 110 is manufactured, the timing characteristics identified above may be characterized and distributed as public information regarding that instance of the hardware cryptographic unit 110. The public information regarding the particular hardware cryptographic unit 110 may be used by an encryption computer to simulate an output than can be searched at the decryption computer using the hardware cryptographic unit 110. While this simulation might take up to several second, for example, to compute, the hardware cryptographic unit 110 can compute it very rapidly, perhaps within several nanoseconds. The large number of possible input values can preclude an attacker from computing HPPUF 150 outputs for all possible input values. Thus, a timely identification of the shared secret key may only be possible from the one particular hardware instance of the hardware cryptographic unit 110. As such, the hardware cryptographic unit 110 containing the HPPUF 150 can serve as the basis of a secure cryptographic system.

Figure 3:
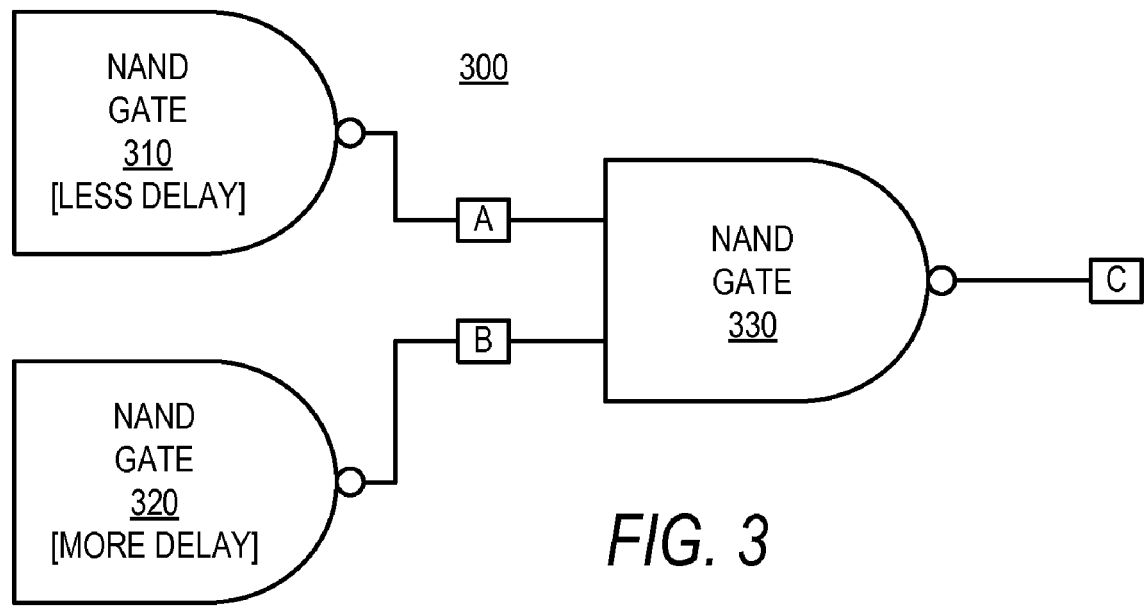
FIG. 3 is a circuit diagram illustrating three logic gates arranged to demonstrate the effects of varying gate delays.

Turning now to FIG. 3, a circuit diagram 300 illustrates three logic gates arranged to demonstrate the effects of varying gate delays according to one or more embodiments presented herein. NAND gate 310 and NAND gate 320 may provide their outputs as inputs to NAND gate 330. NAND gate 310 may have a slightly lower delay than the delay of NAND gate 320. Thus, the output (signal A) of NAND gate 310 may arrive at the input of NAND gate 330 prior to the output of NAND gate 320 (signal B). The output of the NAND gate 330 (signal C) can depend upon both signal A and signal B since NAND gate 330 takes signals A and B as its input.

Figure 4:
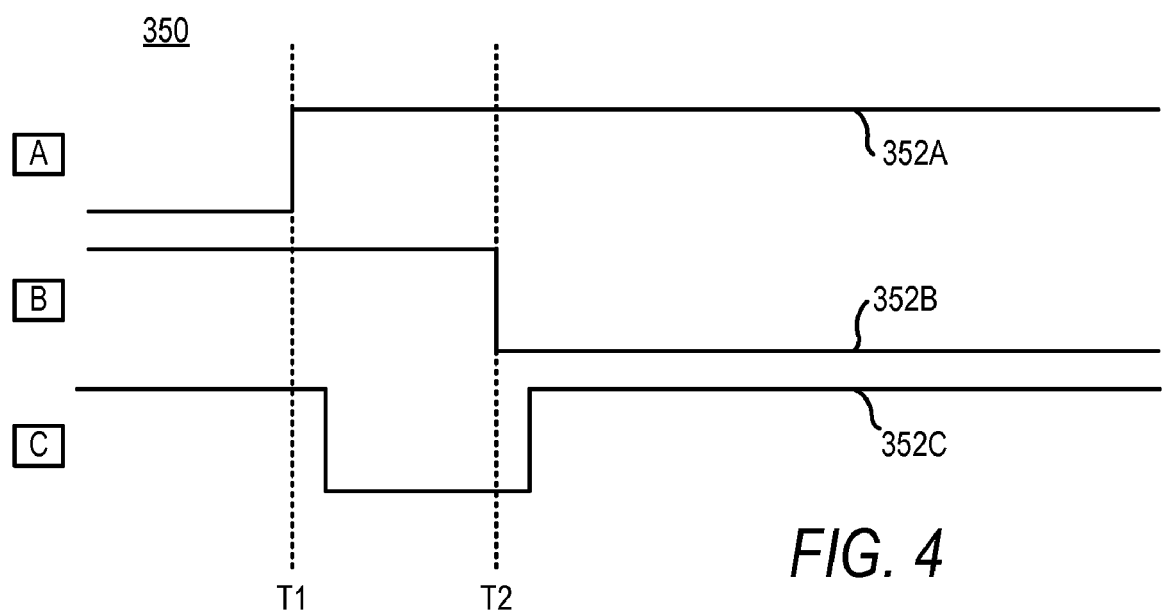
FIG. 4 is a timing diagram illustrating the effects of increasing the number of signal transitions due to varying gate delays between two layers of a hardware public physically unclonable function.

Turning now to FIG. 4, a timing diagram 350 illustrates the effects of increasing the number of signal transitions due to varying gate delays between two layers of a hardware public physically unclonable function according to one or more embodiments presented herein. The signals within the timing diagram 350 are those defined with respect with FIG. 3. The NAND gate 310 output is signal A and is illustrated as timing trace 352A. The NAND gate 320 output is signal B and is illustrated as timing trace 352B. The NAND gate 330 output is signal C and is illustrated as timing trace 352C. The transition of the NAND gate 310 output (signal A) is at time T1 and is followed later at time T2 with the transition of the output from NAND gate 320 (signal B). The trace 352C for signal C illustrates the output of NAND gate 330 taking signal A and signal B as its input. The trace 352C for signal C illustrates how the output of NAND gate 330 may transition at each transition of its input. Thus, the delay between the two inputs from NAND gate 310 and NAND gate 320 may cause the output of NAND gate 330 to actually transition twice even though there is only one transition at each of the inputs. With a potentially doubling of signal transitions at each layer in a stack of two-input gates, layer H may have as many as $2^H$ signal transitions over a short period of time. The output of the hardware cryptographic unit 110 may be obtained by sampling this sequence of transitioning values at a specified time. The slight delay in transitions within the trace 352C for signal C may be related to the delay through NAND gate 330.

Sampling the sequence of transitioning output values may require a very accurate timing mechanism. The accuracy requirement may increase exponentially with H. As discussed above, increasing M (an iteration count for applying the HPPUF 150) and increasing W (a width associated with the HPPUF 150) can reduce the value for H without necessarily decreasing the computational complexity of the HPPUF 150. A value of H=20 may be currently reasonable for manufactured logic gates. A value of H=30 may be considered a limit of on-chip clocking according to certain semiconductor embodiments. A value of H=70, or more, may be possible with advanced clocking techniques such as technology used in atomic clocks.

Figure 5:
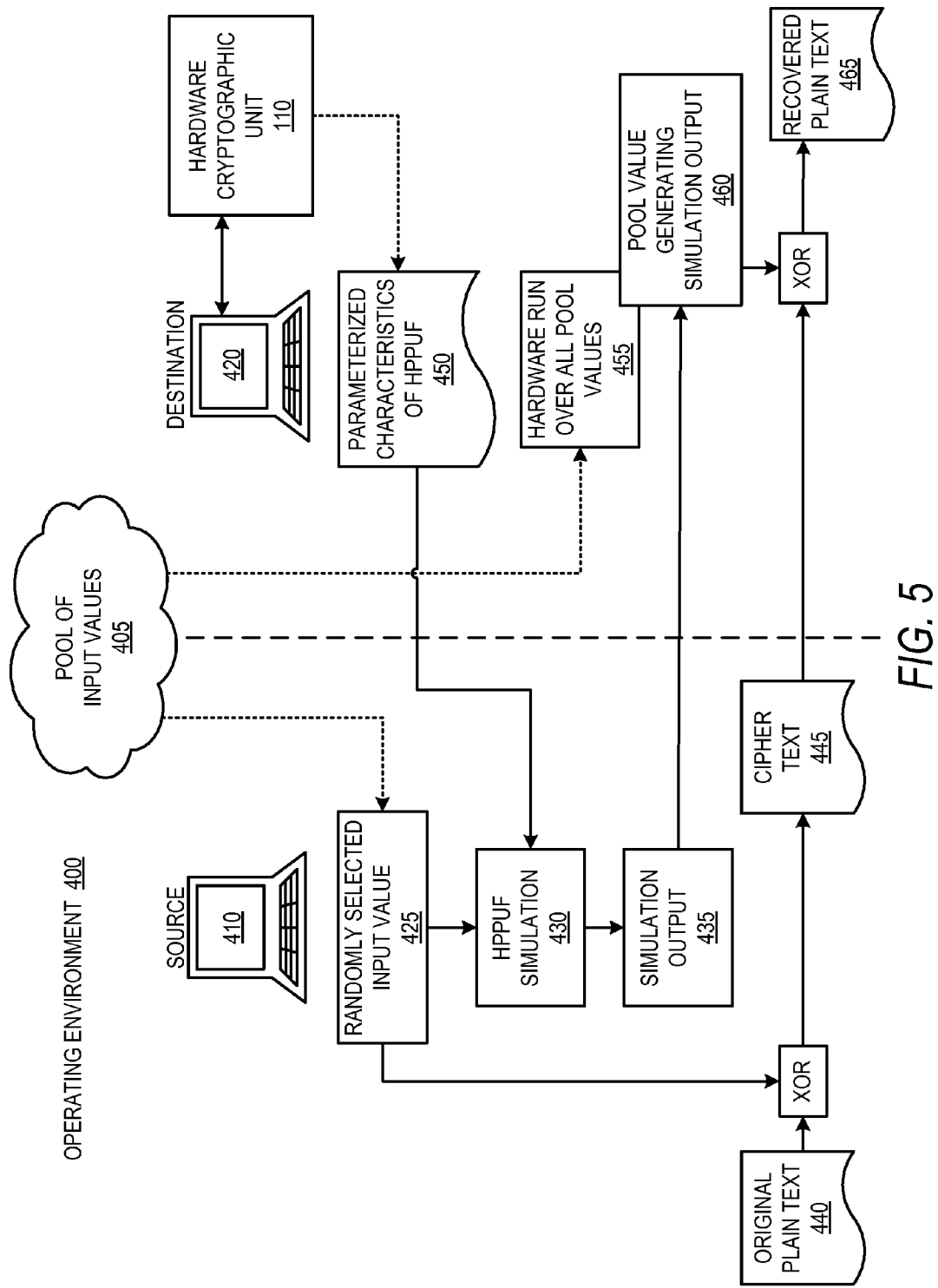
FIG. 5 is a computer network diagram illustrating an operating environment for hardware based cryptography.

Referring now to FIG. 5, a computer network diagram illustrates an operating environment 400 for hardware based cryptography. A message can be encrypted at a source computer 410 for transmission to a destination computer 420. The message can be decrypted at the destination computer 420. A pool of input values 405 can comprise a large selection space of inputs to the HPPUF 150 (shown in FIG. 1) of the hardware cryptographic unit 110. The selection space for the pool of input values 405 may be all possible values of the size specified by the input register 140 of the hardware cryptographic unit 110. The selection space may also be some subset of the larger possible space. The input values associated with the pool of input values 405 may also be referred to as initialization values of the cryptographic unit 110. The input values may also be considered secret cryptographic keys.

The destination computer 420 may be coupled to a hardware cryptographic unit 110. The parameterized characteristics 450 of the HPPUF 150 associated with the hardware cryptographic unit 110 may be transmitted from the destination computer 420 to the source computer 410. The source computer 410 can randomly select an input value 425 from the pool of input values 405. A simulation 430 of the HPPUF 150 may be performed at the source computer 410 using the parameterized characteristics 450 of the HPPUF 150. The simulation 430 of the HPPUF 150 can generate a simulation output 435 from the randomly selected input value 425. The simulation output 435 can be transmitted from the source computer 410 to the destination computer 420. The destination computer 420 can apply the hardware cryptographic unit 110 to all values in the pool of input values 405 using a hardware run over all pool values 455 to identify the pool value that generates the simulation output 460. As such, the destination computer 420 can recover the randomly selected input value 425 known only to the source computer 410. Now the secret of the randomly selected input value 425 is shared between the source computer 410 and the destination computer 420 without ever having transmitted the randomly selected input value 425 openly over the communications channel between the source computer 410 and the destination computer 420.

With the randomly selected input value 425 known at the source computer 410 and the destination computer 420, the randomly selected input value 425 can be used as a cipher or cryptographic key to encrypt and decrypt information. The source computer 410 can XOR (exclusive-OR) the randomly selected input value 425 with an original plaintext message 440 to generate a ciphertext message 445. The ciphertext message 445 can be transmitted from the source computer 410 to the destination computer 420. At the destination computer 420, the cipher text message 445 can be XORed with the randomly selected input value 425 that was recovered as the pool value generating the simulation output 460.

The XORing of the pool value generating the simulation output 460 with the received ciphertext 445, at the destination computer 420, can generate the recovered plaintext 465 at the destination computer 420. The randomly selected input value 425 may be considered a secret key or shared secret. The system 400 may also be used to share any type of key by performing secure key distribution or key sharing. The plaintext 440 may be replaced by a key that is to be securely transmitted from the source computer 410 to the destination computer 420. Once any type of key is shared between the source computer 410 and the destination computer 420, that key can be used in reverse to transmit information from the destination computer 420 to the source computer 410. A key, once exchanged, can also be used as an input to a stream cipher or as a seed to a random number generator. Both such approaches can support messages of arbitrary length.

The cryptographic system 400 can support a cryptographic approach that combines traditional public key or secret key cryptographic protocols with the hardware based cryptographic techniques disclosed herein. The cryptographic system 400 can be operated such that the encrypted message is obtained by applying a hash function on the input vector instead of using the randomly selected input value 425 directly. The cryptographic system 400 can be operated such that the encrypted message is obtained by applying a hash or other type of function on a subset of the outputs or intermediate values associated with the HPPUF 150.

Figure 6:
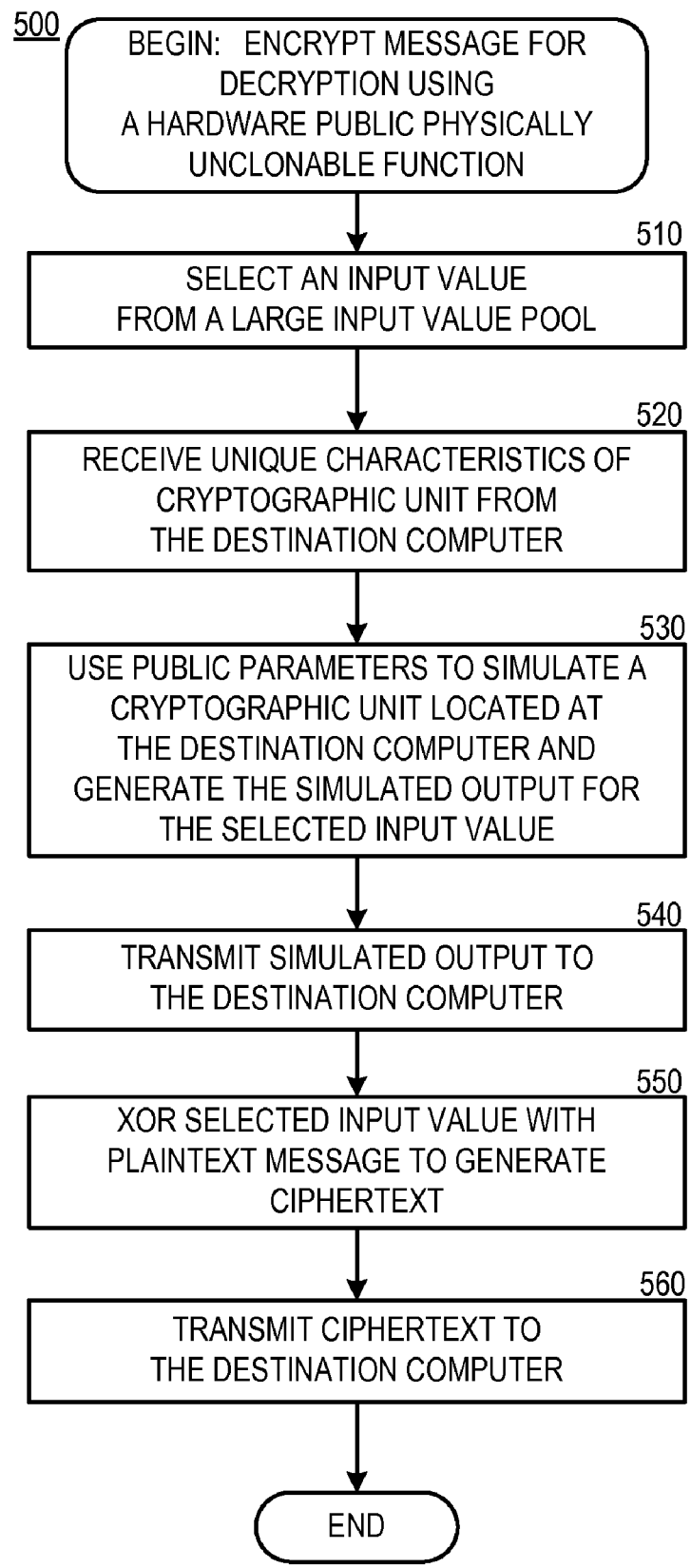
FIG. 6 is a flow diagram illustrating a process for encrypting a message for decryption using a hardware public physically unclonable function.

Referring now to FIG. 6, additional details will be provided regarding the embodiments presented herein for cryptographic techniques using hardware public physically unclonable functions. In particular, FIG. 6 is a flow diagram illustrating a process 500 for encrypting a message for decryption using a hardware public physically unclonable function according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

Process 500 begins at operation 510, where an input value may be selected from a large input value pool 405 by a source computer 410. The selection may be made randomly, pseudo-randomly, or in any other fashion. Once shared to the destination computer 420, the randomly selected input value 425 may be considered a shared secret key between the source computer 410 and the destination computer 420. Continuing to operation 520, parameterized characteristics for simulating the HPPUF 150 may be received at the source computer 410 from the destination computer 420. The HPPUF 150 associated with the parameterized characteristics may be contained within the hardware cryptographic unit 110 associated with the destination computer 110.

Continuing to operation 530, the public parameterized characteristics that were received in operation 520 may be used by the source computer 410 to simulate the hardware cryptographic unit 110 located at the destination computer 420. The simulation of the hardware cryptographic unit 110 may be used to generate a simulated output 435 for the randomly selected input value 425 as selected in operation 510.

Continuing to operation 540, the simulated output 435 may be transmitted from the source computer 410 to the destination computer 420. Continuing to operation 550, the source computer 410 can XOR the selected input value 425 with a plaintext message 440 to generate a ciphertext 445. Continuing to operation 560, the ciphertext 445 may be transmitted from the source computer 410 to the destination computer 420.

Figure 7:
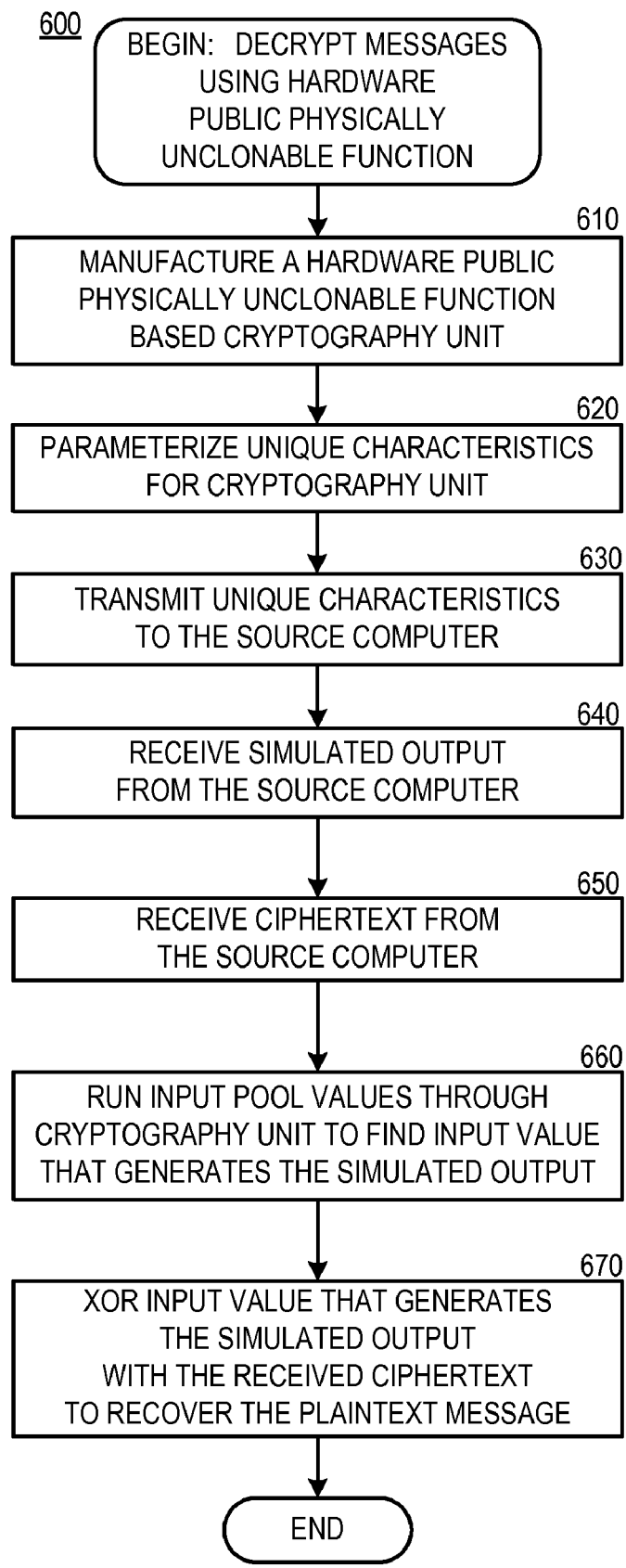
FIG. 7 is a flow diagram illustrating a process for decrypting messages using hardware public physically unclonable functions.

Referring now to FIG. 7, additional details will be provided regarding the embodiments presented herein for cryptographic techniques using hardware public physically unclonable functions. In particular, FIG. 7 is a flow diagram illustrating a process 600 for decrypting messages using hardware public physically unclonable functions according to at least some embodiments presented herein.

Process 600 begins at operation 610, where a hardware cryptographic unit 110 comprising a hardware public physically unclonable function may be manufactured. Continuing to operation 620, unique characteristics may be parameterized for the hardware cryptographic unit 110. Continuing to operation 630, the unique characteristics parameterized in operation 620 may be transmitted to the source computer 410.

Continuing to operation 640, the destination computer 420 may receive a simulated output from the source computer 410. Continuing to operation 650, a ciphertext, or encrypted message, may be received from the source computer 410 by the destination computer 420. Continuing to operation 660, all values from the pool of input values 405 may be run through the hardware cryptographic unit 110 to find the particular input value that generates the simulated output 435 received from the source computer 410 in operation 640. Identifying the randomly selected input value 425 from the pool of input values 405 that generates the received simulated output 435 can supply the destination computer 420 with the value of the randomly selected input value 425 previously only known to the source computer 410. This value is now a shared secret between the source computer 410 and the destination computer 420.

Continuing to operation 670, the input value determined in operation 660 may be used by the destination computer 420 to decrypt the ciphertext 445 received in operation 650. The input value determined in operation 660 may be XORed with the received ciphertext 445 that was received in operation 650 to produce the recovered plain text 465.

Figure 8:
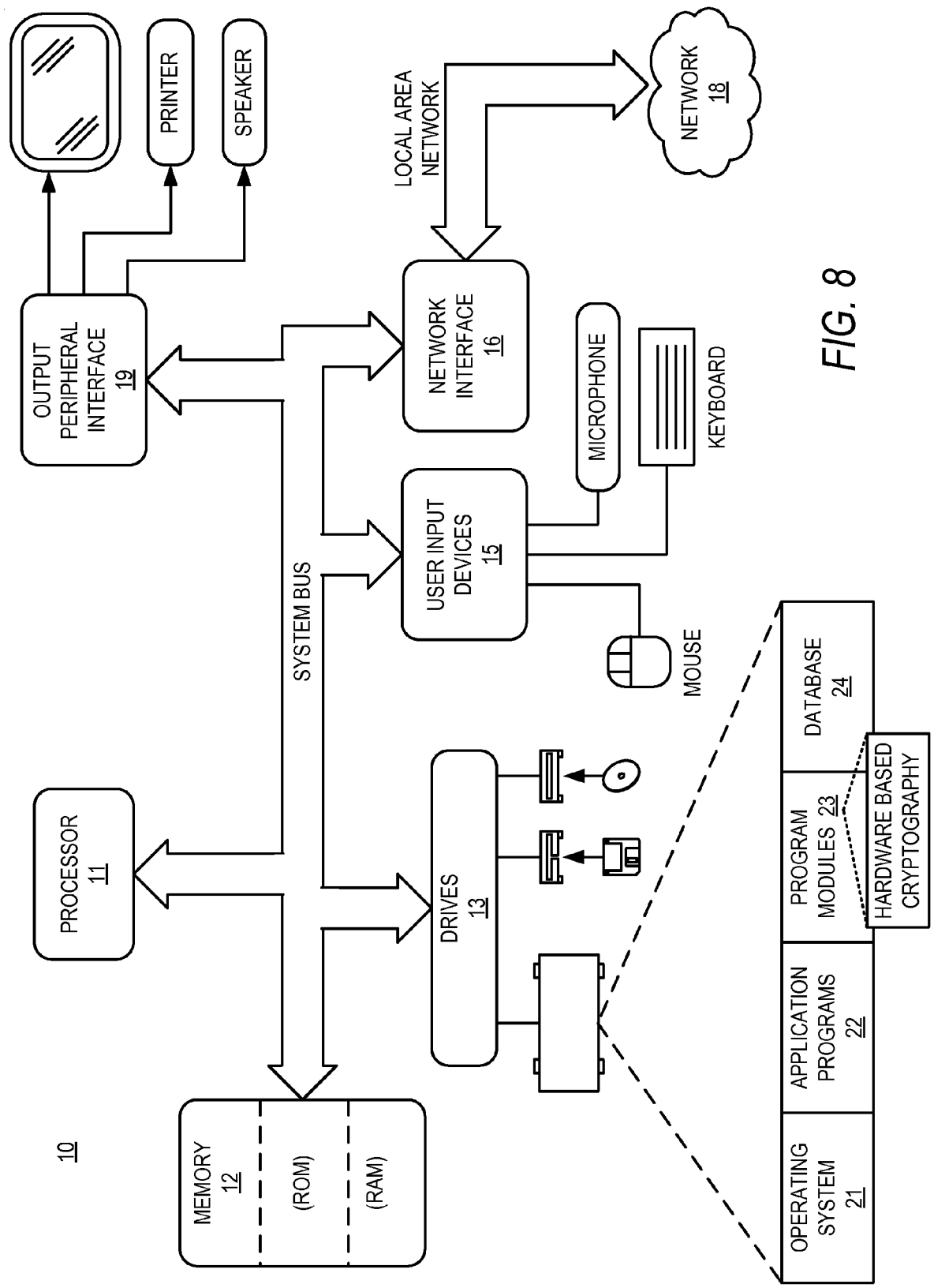
FIG. 8 is a block diagram illustrating an exemplary computing system, all arranged according to embodiments presented herein.

With reference to FIG. 8, an exemplary computing system is illustrated for implementing various embodiments. The computing system can support embodiments for the host computer 120, the source computer 410, the destination computer 420, or a computer used in the manufacture and characterization of the hardware cryptographic unit 110. The computing system includes a computer 10. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The drives 13, other storage devices, or their associated computer-readable storage media can store an operating system 21, application programs 22, program modules 23, and a database 24. The computer 10 can include user input devices 15 through which a user may enter commands and data. Input devices can include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices can be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer can include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 can include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 can perform cryptographic operations using hardware public physically unclonable functions in accordance with embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23. The program modules 23 may include software instructions that, when loaded into the processor 11 and executed, transform a general-purpose computing system into a special-purpose computing system customized to facilitate cryptographic operations using hardware public physically unclonable functions. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 12 transitions between states, thereby transforming the transistors or other circuit elements constituting the processor 11 from a first machine to a second machine, wherein the second machine may be specifically configured to support cryptographic operations using hardware public physically unclonable functions. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof.

Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A method for exchanging a shared secret using a hardware public physically unclonable function, the method comprising:
receiving a simulated output of the hardware public physically unclonable function;
loading at least one of a pool of possible initial values into an input register associated with the
hardware public physically unclonable function;
coupling logic signals corresponding to the loaded values from the input register into the hardware public physically unclonable function;
propagating the logic signals through the hardware public physically unclonable function so as to generate a second set of logic signals from the coupled logic signals;
latching the second set of logic signals from the hardware public physically unclonable function into an output register;
comparing the latched output register with the received simulated output; and
identifying the loaded initial value as the shared secret in response to the latched output register matching the received simulated output.

2. The method of claim 1, further comprising initializing the input register to a known state prior to loading the initial values.

3. The method of claim 1, wherein the hardware public physically unclonable function comprises a plurality of logic gates.

4. The method of claim 1, wherein the hardware public physically unclonable function comprises nanowires.

5. The method of claim 1, wherein the hardware public physically unclonable function comprises photonic crystals.

6. The method of claim 1, further comprising receiving an encrypted message and decrypting the encrypted message by combining the encrypted message with the shared secret.

7. The method of claim 1, further comprising configuring an input to a stream cipher using the shared secret.

8. A non-transitory computer storage medium having computer-executable instructions stored thereon which, when executed by a computer, configure the computer to share a secret input value by:
selecting an input value from a pool of input values;
receiving information characterizing unique parameters associated with a hardware public physically unclonable function;
simulating the hardware public physically unclonable function based on the information characterizing unique parameters to generate a simulated output from the selected input value; and
transmitting the simulated output to a computer hosting the hardware public physically unclonable function where the selected input value can be recovered by loading one or more input values from the pool of input values into the hardware public physically unclonable function and comparing an output of the hardware public physically unclonable function to the simulated output.

9. The computer storage medium of claim 8, wherein the selected input value and the recovered selected input value comprise a shared secret between the computer and the computer hosting the hardware public physically unclonable function.

10. The computer storage medium of claim 9, further comprising causing the computer to combine the shared secret with a plaintext message to generate a ciphertext message to be transmitted to the computer hosting the hardware public physically unclonable function.

11. The computer storage medium of claim 9, wherein the shared secret is an input to a stream cipher.

12. The computer storage medium of claim 9, wherein the shared secret supports decrypting messages received from the computer hosting the hardware public physically unclonable function.

13. The computer storage medium of claim 9, wherein the shared secret supports a secure key exchange between the computer and the computer hosting the hardware public physically unclonable function.

14. A cryptographic system comprising:
a hardware public physically unclonable function having operational characteristics capable of being parameterized, wherein the parameters are related to manufacturing variability within the hardware public physically unclonable function;
an input register for loading signals into the hardware public physically unclonable function;
an output register for delivering result values from the hardware public physically unclonable function; and
a search module operable to search an input space by receiving a simulated output of the hardware public physically unclonable function, loading elements of the input space into the input register~ and identifying a desired result at the output register by comparing an output from the output register to the received simulated output.

15. The cryptographic system of claim 14, further comprising a timing mechanism for determining when the result values are latched at the output register.

16. The cryptographic system of claim 14, further comprising an interface to a host computer, the interface configured to communicate with the search module.

17. The cryptographic system of claim 14, wherein the hardware public physically unclonable function operates with a time less than a time used for simulating the hardware public physically unclonable function from the parameterized characteristics.

18. The cryptographic system of claim 14, wherein the hardware public physically unclonable function comprises a plurality of logic gates.

19. The cryptographic system of claim 14, wherein the hardware public physically unclonable function comprises nanowires.

20. The cryptographic system of claim 14, wherein the hardware public physically unclonable function comprises photonic crystals.

* * * * *

UNITED STATES PATENT AND TRADEMARK OFFICE
CERTIFICATE OF CORRECTION

PATENT NO. : 8,379,856 B2
APPLICATION NO. : 12/486451
DATED : February 19, 2013
INVENTOR(S) : Potkonjak It is certified that error appears in the above-identified patent and that said Letters Patent is hereby corrected as shown below:

On the Title Page, item (56), under "OTHER PUBLICATIONS", in Column 2, Line 2, delete "Secrey" and insert -- Secret --, therefor.

On Title Page 2, item (56), under "OTHER PUBLICATIONS", in Column 1, Line 4, delete "1462.," and insert -- 1462, --, therefor.

On Title Page 2, item (56), under "OTHER PUBLICATIONS", in Column 2, Line 17, delete "Factorization,"," and insert -- Factorization," --, therefor.

On Title Page 2, item (56), under "OTHER PUBLICATIONS", in Column 2, Line 22, delete "al,," and insert -- al., --, therefor.

On Title Page 2, item (56), under "OTHER PUBLICATIONS", in Column 2, Line 27, delete "et al, "Meta-ElGarnal" and insert -- et al., "Meta-ElGamal --, therefor.

On Title Page 2, item (56), under "OTHER PUBLICATIONS", in Column 2, Line 31, delete "43 (1,): 3-15" and insert -- 43 (1), p. 3-15 --, therefor.

On Title Page 2, item (56), under "OTHER PUBLICATIONS", in Column 2, Line 32, delete "coatinas"," and insert -- coatings", --, therefor.

On Title Page 3, item (56), under "OTHER PUBLICATIONS", in Column 1, Line 8, delete "Sythesis," and insert -- Synthesis, --, therefor.

On Title Page 3, item (56), under "OTHER PUBLICATIONS", in Column 1, Line 13, delete "Of" and insert -- of --, therefor.

On Title Page 3, item (56), under "OTHER PUBLICATIONS", in Column 2, Line 4, delete "Ocmmunications" and insert -- Communications --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,379,856 B2

On Title Page 3, item (56), under "OTHER PUBLICATIONS", in Column 2, Line 19, delete "104):265-310" and insert -- 10(4), 265-310 --, therefor.

In the Specifications:

In Column 6, Line 14, delete "150." and insert -- 110. --, therefor.

In Column 10, Line 65, delete "510" and insert -- 510. --, therefor.

In Column 12, Line 28, delete "networks" and insert -- wide area network --, therefor.

In the Claims:

In Column 15, Lines 23-24, in Claim 1, delete "with the.........function;" and insert -- with the hardware public physically unclonable function; --, therefor.

In Column 16, Line 41, in Claim 14, delete "register~" and insert -- register --, therefor.